Figure 1:
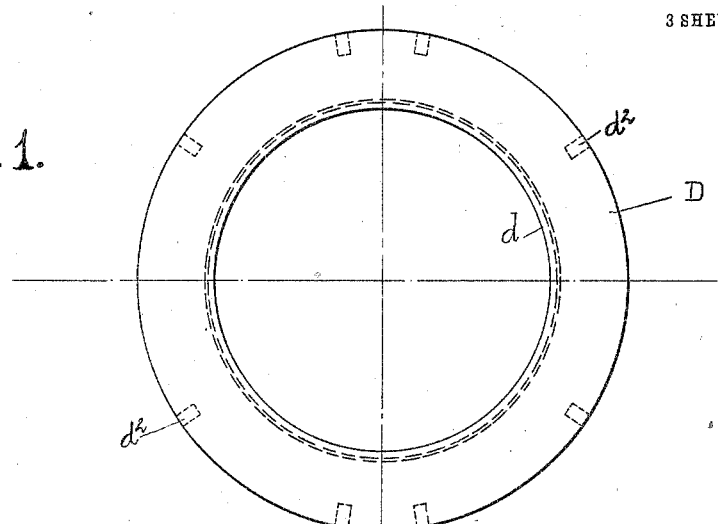

No. 776,971. PATENTED DEC. 6, 1904.
J. D. WALSH.
PIPE COUPLING.
APPLICATION FILED APR. 22, 1904.
NO MODEL. 3 SHEETS—SHEET 1.

WITNESSES_
Charles R Bishop
H. J. Babcock

INVENTOR_
John D. Walsh
By R. S. Dyrenforth
ATTORNEY.

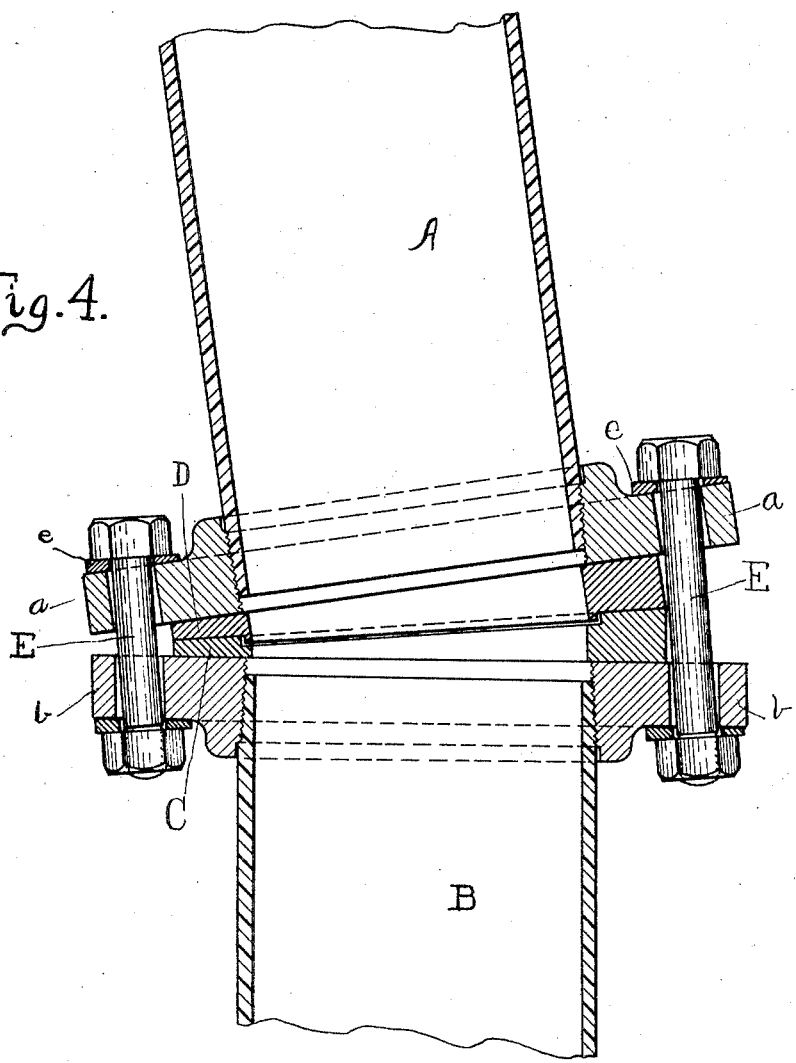

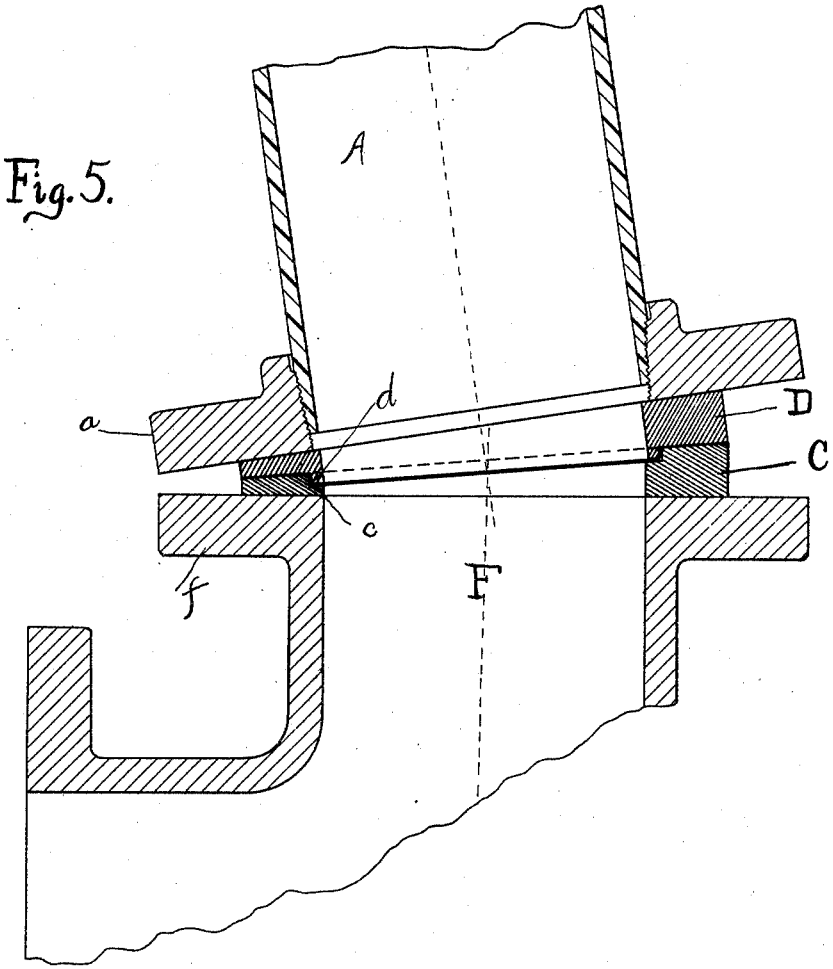

No. 776,971. Patented December 6, 1904.

UNITED STATES PATENT OFFICE.

JOHN D. WALSH, OF LOCKPORT, NEW YORK, ASSIGNOR TO AMERICAN DISTRICT STEAM COMPANY, OF LOCKPORT, NEW YORK, A CORPORATION OF NEW YORK.

PIPE-COUPLING.

SPECIFICATION forming part of Letters Patent No. 776,971, dated December 6, 1904.

Application filed April 22, 1904. Serial No. 204,472. (No model.)

*To all whom it may concern:*

Be it known that I, JOHN D. WALSH, a citizen of the United States, residing at Lockport, in the county of Niagara and State of New York, have invented certain new and useful Improvements in Pipe-Couplings; and I do hereby declare the following to be a full, clear, and exact description of the invention, such as will enable others skilled in the art to which it appertains to make and use the same.

My invention relates to detachable pipe-couplings.

The object of my invention is to provide an improved form of device of this character comprising few parts and of simple construction, which will efficiently do away with the necessity for pipe-elbows of various angles and the use of bent pipe.

A further object is to provide expeditious means of simple construction which may be placed between the ends of adjacent pipes or between the end of a pipe and a fitting or between two fittings, whereby rotation of such means will vary the axes of such connections from a line to any angle desired within certain limits.

A further object of my invention is to provide a solid bearing for bolts used in connection and combination with my invention; and my invention consists of the construction, arrangement, and combination of parts in this application illustrated and described.

In the accompanying drawings, forming a part of this application, in which similar reference characters indicate corresponding parts, I have illustrated one form of embodiment of my invention, and in which—

Figure 2:
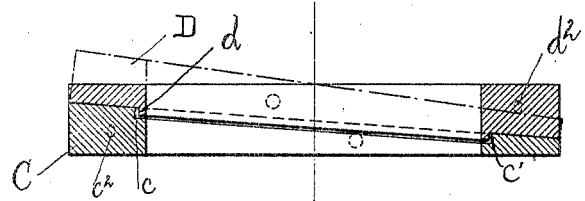
Figure 3:
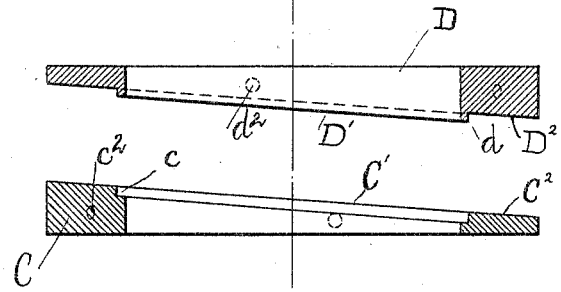

Figure 1 is a plan view of one of the members of my device. Fig. 2 is a sectional view of both members of my device engaged and showing in dotted lines one of said members in a second position. Fig. 3 is a sectional view of both of the members of my device separated, but in relative operative position. Fig. 4 is a sectional view of two adjacent pipe ends coupled together by my invention, and Fig. 5 is a sectional view showing the application of my invention in connecting a pipe end and a fitting.

Referring to the drawings, A and B indicate adjacent pipe ends, and $a$ and $b$ flanges thereon, held together, as by bolts E or other suitable means. Disposed between the bolt-heads and the flanges are wedge-shaped washers $e$, constructed to afford a solid bearing for the bolt-heads when my invention is applied to any ordinary flanged pipe or fitting. F indicates a fitting, having a flange $f$, to be used in any manner similar to a pipe end. Disposed between the opposed pipe ends are rings C D, having in their peripheries openings $c^2 d^2$, adapted to receive a spanner or similar instrument to rotate one ring upon the other. The opposing faces C' D' of the rings are cut obliquely to their axes, making the two members angularly adjustable with reference to each other. Around the inner edge of face C' is a narrow rabbet $c$, leaving a wide bearing-surface $C^2$ around the remainder of the face, and on the inner edge of face D' is a thin annular rib $d$, the rest of the face forming a wide bearing-surface $D^2$. When the parts are assembled, surfaces $C^2 D^2$ form a tight joint, and rib $d$ takes into rabbet $c$, but is of such diameter as to leave an annular chamber $c'$ between it and the inner wall of the rabbet and preferably is of such depth as not to contact with the bottom of the rabbet, thus obviating danger of the close bearing of surfaces $C^2 D^2$ being destroyed by the collection of foreign matter in the rabbet.

The advantages of the foregoing construction will be apparent when it is remembered that an oblique section of a ring is not a perfect circle. For this reason and also on account of the expansion of the rabbet due to the heat of the fluid within the pipe the rib would be certain to bind in the rabbet and prevent rotation were annular chamber $c'$ not provided. It is found that this chamber serves as a reservoir for steam or other fluid passing through the pipe, particularly when rib $d$ is made short for the purpose specified or when packing-disks are inserted between the rings separating the rib from the rabbet. By making the rib and rabbet narrower than the bearing-surfaces annular chamber $c'$ is located well toward the inner edges of the rings, whereby the width of the bearing-surfaces prevents fluid from leaking from the chamber outward.

In the operation of my invention when two pipes are connected by my device in the position shown in Fig. 2 in full lines their axes will coincide. It is obvious that the rotation of one or both of the members C D will throw the axes of the pipes out of alinement, forming an angle which is greatest when the thinnest edges of these two members are adjacent to each other. It will be seen that any angle of adjacent pipes can be secured in a simple and expeditious though very efficient way by rotating one of these members. Steam-tight joints may be made between the parts by the use of gaskets or in any suitable and usual way.

Having thus fully described my invention and without limiting myself to the exact forms of construction and arrangement herein shown and described, what I claim as new, and desire to secure by Letters Patent, is—

1. A device for angularly adjusting adjoining pipe ends, comprising two rings having their opposing faces cut obliquely to their axes, the oblique face of one of the rings being provided with a groove around its inner edge, the remainder of the face forming a bearing-surface wider than the groove, and the oblique face of the other ring being provided with an annular rib occupying the groove and of such width as to leave an annular chamber between it and the inner wall of the groove, the rest of the face forming a bearing-surface wider than the rib and contacting with the other bearing-surface.

2. A device for angularly adjusting adjoining pipe ends, comprising two rings having their opposing faces cut obliquely to their axes, the oblique face of one of the rings being provided with a groove around its inner edge, the remainder of the face forming a bearing-surface wider than the groove, and the oblique face of the other ring being provided with an annular rib occupying the groove, the rib being of less depth than the groove and of such width as to leave an annular chamber between it and the inner wall of the groove, the rest of the face forming a bearing-surface wider than the rib and contacting with the other bearing-surface.

In testimony whereof I affix my signature in the presence of two subscribing witnesses.

JOHN D. WALSH.

Witnesses:
CHARLES R. BISHOP,
H. J. BABCOCK.